Patented Dec. 3, 1929

1,738,189

UNITED STATES PATENT OFFICE

HAROLD T. LEAVENWORTH, OF BRIDGEPORT, CONNECTICUT

PROCESS AND AGENT FOR CARROTING FURS

No Drawing.   Application filed April 4, 1928.   Serial No. 267,477.

This invention relates to processes of and compositions for treating fur or like material preparatory to felting and it comprises a process in which fur is subjected to the action of an aqueous solution containing chloric or perchloric acid advantageously, altho not necessarily together with nitric acid; it further comprises a fur treating solution composed at least in part of chloric or perchloric acid and nitric acid in aqueous solution; and it further comprises the fur so treated.

In preparing fur for felting purposes, it is customary practice to treat the fur with various chemicals coming under the general head of carroting agents. Such substances act to remove the waxy or gummy material with which the individual fibres of fur are normally coated or sheathed at least in part. As is well recognized, the individual fur fibres have a number of overlying scales or barbs forming a part of the fibre structure. These barbs make it possible to felt the individual fibres into a felted mass because the barbs of one fibre interlock with the barbs of another during the felting operation. The waxy or gummy material referred to obscures the barbs and renders them ineffective during the felting operation unless the wax is removed prior to felting in order to fully expose the barbs.

Carroting agents have the property of removing this waxy material or rendering it soluble. Heretofore, mercuric nitrate has been widely employed as a carroting agent, the fur being treated with aqueous solutions thereof. Aside from the essentially poisonous character of mercuric nitrate, it is a disadvantageous material to use for many other reasons. While other carroting agents have been suggested to supplant mercuric nitrate, none of them can be said to be as effective as this material. There is thus a real necessity for a carroting composition which is at least, if not more, effective than mercuric nitrate, or other mercury compounds, being, however, free from the injurious toxic effects associated with salts of mercury.

I have found that perchloric acid, or chloric acid, which can also be used in conjunction with an aqueous solution of nitric acid, is an excellent carroting agent and possesses all the virtues of salts of mercury but is entirely free of the numerous disadvantages attendant the use of mercury compounds. An aqueous solution of chloric or perchloric acid rapidly removes the waxy or gummy material normally obscuring the barbs of the fibres and expeditiously prepares the fur for the felting operation. The resulting carroted fur is free from mercury compounds and can thus be subjected to the subsequent operations without having any toxic effect upon the workman. Furthermore, the fibre core is not weakened, altho when salts of mercury are used, it is well recognized that the fibre core suffers a loss in strength.

My carroting solution can be prepared in various ways, depending somewhat on its composition. When using an aqueous solution of chloric acid, having the formula $HClO_3$, I ordinarily add nitric acid to a solution of barium chlorate in quantity sufficient to react with the barium chlorate. Barium chlorate is an advantageous chlorate to use altho I can use other chlorates such as the alkali metal chlorates. The nitric acid acts to displace the chloric acid from its salt, thus forming free chloric acid in situ. An excess of nitric acid is not detrimental and in fact the presence of some free nitric acid is advantageous.

As a specific example, I make up an aqueous solution of one pound of barium chlorate in three pounds of water and add thereto one pound of nitric acid. Sufficient nitric acid is added to react with all the barium chlorate and then a further quantity is added so that there is about a half pound of free nitric acid in the solution which now contains free chloric acid. In this example, the total quantity of solution amounts to five and a half pounds, and this is enough to treat about five pounds of fur. In general, it can be said that the final solution should have a strength of from eight to twenty degrees Baumé.

When using perchloric acid, I make up a solution containing about one pound of barium perchlorate and add to it about one and a half pounds of nitric acid so that the final solution has a concentration in free nitric acid of about ten per cent. In the case of perchloric acid, I can make up a solution of perchloric acid in water by dissolving perchloric acid therein and then adding nitric acid thereto. This has some advantage inasmuch as the solution contains only nitric and perchloric acids aside from water. When the perchloric acid is liberated from its salt as above stated, the final solution also contains dissolved barium nitrate, but this is not to be regarded as a detriment.

If I wish to use a chloric acid solution wholly free of dissolved salts, I can first prepare an aqueous solution of chloric acid by adding sulphuric acid to an aqueous solution of barium chlorate. The barium sulphate formed is filtered off, and to the resulting aqueous solution of chloric acid I add nitric acid until the desired concentration is obtained.

In each of the above examples, it will be observed that in every instance, the carroting solution is essentially composed of the two active ingredients, nitric acid and a chloric acid, the term "a chloric" acid being used to collectively denote chloric or perchloric acid, the latter having the formula $HClO_4$.

When I wish to employ a solution containing chloric or perchloric acid and being free of nitric acid, I decrease the amount of nitric acid added to the chlorate or perchlorate so that just enough acid is added to react. The exact quantity of nitric acid to be added can be readily determined by stoichometrical calculations, one molecular weight of barium chlorate or perchlorate requiring two molecular weights of nitric acid to fully displace all of the chloric or perchloric acid.

The solution of chloric or perchloric acid containing nitric acid if desired, advantageously prepared in one of the above ways, is then applied to the fur. Inasmuch as the solution is very free flowing, it soon reaches all parts of the fur and a regular and uniform treatment is easily secured. It is equally adaptable to manual or machine application. If desired, the fur can be removed from the skin before being treated with the solution, thereafter treated and subsequently dried.

While I have set forth specific examples of ways to prepare my solution, it is, of course, understood that the details and proportions may be varied within wide limits. The most advantageous concentration of chloric or perchloric acid and nitric acid is best determined for each particular batch of fur treated, especially when variation in the quality or other characteristics is suspected.

The carroted fur, prepared in accordance with the present invention is far superior in appearance, strength and texture to carroted fur prepared with carroting agents hitherto proposed. I attribute this to the fact that my carroting solution, while it acts rapidly on the waxy or gummy substances coating the fur fibres, has little or no effect upon the fur fibre itself, and, if anything, it increases the natural sheen and brilliancy, possibly because the treated fur fibres may have upon them a small quantity of material representing the reaction product of the natural wax with the acids of my carroting composition. The carroted fur prepared in accordance with my present invention is more readily blown and felted and when so felted is more readily dyed, this too being attributed to the fact that the fur fibre is uninjured. Because of the superior felting qualities, it is possible to mix in a larger percentage of rougher or cheaper fur stock without serious disadvantage when it is desired to use mixed stocks of varying quality.

In the appended claims, it is to be understood that by the expression "a chloric" acid, I mean to include both chloric and perchloric acid, the latter being generically denoted as a chloric acid.

Having thus described my invention, what I claim is:

1. The process of treating fur which comprises treating the fur with a carroting solution comprising an aqueous solution of a chloric acid.

2. The process of treating fur which comprises treating the fur with a carroting solution comprising an aqueous solution of chloric acid.

3. The process of treating fur which comprises treating the fur with a carroting solution comprising an aqueous solution of a chloric acid, the solution having a strength of from about eight to twenty degrees Baumé.

4. The process of treating fur which comprises treating the fur with a carroting solution comprising an aqueous solution of chloric acid, the solution having a strength of from eight to twenty degrees Baumé.

5. A solution for treating furs comprising an aqueous solution of nitric acid and a chloric acid.

6. A solution for treating furs comprising an aqueous solution of nitric acid and chloric acid.

7. A solution for treating furs comprising an aqueous solution of nitric acid and a chloric acid, the solution having a strength of from eight to twenty degrees Baumé.

8. A solution for treating furs comprising an aqueous solution of nitric acid and chloric acid, the solution having a strength of from eight to twenty degrees Baumé.

9. The process of treating fur which comprises treating the fur with a carroting solution comprising an aqueous solution of nitric acid and a chloric acid.

10. The process of treating fur which comprises treating the fur with a carroting solution comprising an aqueous solution of nitric acid and chloric acid.

11. The process of treating fur which comprises treating the fur with a carroting solution comprising an aqueous solution of nitric acid and a chloric acid, the solution having a strength of from about eight to twenty degrees Baumé.

12. The process of treating fur which comprises treating the fur with a carroting solution comprising an aqueous solution of nitric acid and chloric acid, the solution having a strength of from about eight to twenty degrees Baumé.

Signed at Bridgeport, this 31st day of March, 1928.

HAROLD T. LEAVENWORTH.